United States Patent [19]

Edl et al.

[11] 3,966,840

[45] June 29, 1976

[54] FREE RADICAL POLYMERIZATION OF OLEFINICALLY UNSATURATED MONOMERS, USING PINANYL-PEROXYESTERS

[75] Inventors: Wolfgang Edl, Grosshesselohe; Werner Meister, Munich; Hans Seidl, Grunwald, all of Germany

[73] Assignee: Peroxid-Chemie GmbH, Hoellriegelskreut near Munich, Germany

[22] Filed: Jan. 27, 1975

[21] Appl. No.: 544,226

[30] Foreign Application Priority Data

Jan. 29, 1974 Germany............................ 2404209

[52] U.S. Cl............................ 260/860; 260/470 A; 260/63 UY; 260/75 A; 260/75 T
[51] Int. Cl.$^2$.................. C08L 67/02; C08L 67/06; C07C 69/02; C07C 179/18
[58] Field of Search................ 260/860, 861, 468 R, 260/453 R, 80 C, 468 K, 610 R

[56] References Cited

UNITED STATES PATENTS

| | | | |
|---|---|---|---|
| 2,264,354 | 12/1941 | Alder et al. | 260/453 R |
| 2,892,814 | 6/1959 | Koch et al. | 260/860 |
| 2,957,030 | 10/1960 | Bankert | 260/861 |
| 3,061,554 | 10/1962 | Vartanian et al. | 260/861 |
| 3,231,599 | 1/1966 | Kilsheimer et al. | 260/453 R |
| 3,706,818 | 12/1972 | Mageli et al. | 260/885 |
| 3,850,891 | 11/1974 | Crawford | 260/453 R |

*Primary Examiner*—Murray Tillman
*Assistant Examiner*—Thurman K. Page
*Attorney, Agent, or Firm*—Hans Berman; Kurt Kelman

[57] ABSTRACT

The esters of pinane hydroperoxide with carboxylic acids are effective free radical initiators for the polymerizaton of olefinically unsaturated monomers, and are superior to the corresponding esters of tert-butyl peroxide by their shorter half-life at equal temperature.

9 Claims, No Drawings

FREE RADICAL POLYMERIZATION OF OLEFINICALLY UNSATURATED MONOMERS, USING PINANYL-PEROXYESTERS

This invention relates to the free radical polymerization of olefinically unsaturated monomers, and particularly to the novel use of known or readily available peroxyesters.

It has been found that the carboxylic acid esters of pinane hydroperoxide are effective initiators in the polymerization of olefinic monomers wherever other peroxide esters are known or expected to be used successfully.

Pinane hydroperoxide is produced on an industrial scale and is employed in the redox polymerization of cold rubbers. Some esters of pinane hydroperoxide are known and were investigated heretofore (see Ch. Ruchardt, "Fortschritte der chemischen Forschung,"vol. 6, No. 2, page 291; publ. by Springer, Berlin and New York, 1966). They were reported to undergo heterolytic decomposition upon heating.

Organic peroxides act as initiators in polymerization reactions because they undergo homolytic cleavage of the O—O bond to form free radicals. The radicals cause the formation of active sites in unsaturated monomers, the term being used broadly to include molecules which themselves were produced by a polymerization or polycondensation reaction. The active sites unite or form cross links.

It was surprising, therefore, that pinanylperoxyesters of carboxylic acids are effective initiators for polymerization reactions known to require free radical initiators. The pinane hydroperoxide esters found to be effective free radical initiators are of the formula

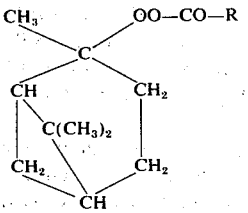

wherein R is primary, secondary, or tertiary alkyl, cycloalkyl, aralkyl, aryl, haloaryl, alkylaryl, alkoxyaryl, alkoxyalkyl, or arylalkyloxyalkyl.

Pinanylperoxy benzoate and pinanylperoxy-2-ethyl-hexanoate (pinanylperoxy octoate) have shorter half life values than the corresponding esters of tert-butyl-hydro-peroxide which are staple articles of commerce (Lucidol, Buffalo, N.Y.). Under identical testing conditions, the half life values of pinanylperoxy benzoate at 90°, 100°, and 110°C are 22, 6.0 and 2.1 hours respectively, whereas the corresponding values of t-butyl-peroxy benzoate are 135, 30, and 7.8 hours. Pinanyl-peroxy 2-ethylhexanoate has half life values of 30, 9.5, and 2.5 hours at 60°, 70°, and 80°C respectively, whereas the half life values for the corresponding tert-butyl peroxyesters are 140, 28, and 5.7 hours.

The peroxyesters of pinane are readily prepared in a known manner from pinane hydroperoxide and the acyl chlorides of the carboxylic acids in an alkaline medium. The acyl radical affects the half life value of the pinane peroxyesters in the expected manner, but is otherwise not critically important if free from reactive groups as will be obvious.

Suitable acyl moieties in the polymerization initiators of the invention may thus be derived from alkanoic acids having straight or branched chains. When R is primary alkyl, it preferably has 3 to 12 carbon atoms to provide the pinanyl peroxyesters of butyric, valeric, caproic, caprylic, pelargonic, capric, or lauric acid and their homologs. However, primary alkanoic acids having branched carbon chains, such as 3,3,5-trimethyl-hexanoic acid, are equally effective, as are the secondary and tertiary alkanoic acids including 2-ethyl-n-hexanoic acid, 2-ethylbutyric acid, 2-methylpentanoic acid, 2-octyloctanoic acid, also pivalic acid, neohexanoic acid (2,2-dimethylbutanoic acid) and the homologous neoheptanoic, neooctanoic, neononanoic, neodecanoic, and neoundecanoic acids.

Derivatives of the afore-mentioned alkanoic acids having inert substituents and forming pinane hydroperoxide esters are suitable components for initiators in free radical polymerization and include ethoxyacetic acid, benzyloxyacetic acid, and phenoxyacetic acid.

The alicyclic radicals represented by R in the above formula preferably have five to twelve carbon atoms, and thus include, but are not limited to, cyclopentanecarboxylic acid, cyclohexanecarboxylic acid, 1-methylcyclohexanecarboxylic acid, and cycloheptanecarboxylic acid.

Benzoic acid and its alkyl, alkoxy, and halogen substitution products including monochlorobenzoic acid, monomethylbenzoic acid, and methoxybenzoic acid form suitable esters with pinane hydroperoxide.

As is evident from the acids specifically mentioned above, R may be chosen freely from a virtually unlimited range of hydrocarbyl radicals and their derivatives having functionally inert substituents, hydrocarbyloxy and halogen being such substituents.

The pinanylperoxyesters of the invention are useful in polymerization reactions carried out in bulk, in organic solvents or in aqueous media, that is, in bulk, solution, and suspension polymerization. They are effective in initiating polymerization of a wide range of olefinically unsaturated monomers including ethylene, styrene, α-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phathalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adipate, methallyl propionate, allyl chloride, methallyl chloride, allyl acrylate, and methallyl methacrylate. The conjugated dienes, such as butadiene and chloroprene, are suitable.

The pinanylperoxyesters are also effective as catalysts for the copolymerization of the above-described compounds with each other or with other types of polymerizable organic compounds, particularly those containing at least one ethylenic linkage; such as the saturated esters of the unsaturated acids, e.g., diethyl maleate, dibutyl crotonate, and the like.

Peroxyesters have found a particularly important field of application as initiators for the curing of unsaturated polyester resin compositions. The esters of pinane hydroperoxide are employed to advantage in the known polymerization reactions. They may be used jointly with other effective organic peroxide initiators and with metallic promotors such as the vanadium compounds disclosed in German Pat. No. 1,175,880, particularly for the curing of unsaturated polyester resin compositions.

The polyesters which constitute one component of such polyester resin compositions may be obtained by esterifying preferably ethylenically unsaturated di- or polycarboxylic acid or their anhydrides, such as maleic acid, fumaric acid, glutaconic acid, itaconic acid, mesaconic acid, citraconic acid, allyl malonic acid, allyl succinic acid, and others, with saturated or unsaturated polyalcohols such as ethylene glycol; diethylene glycol (2,2′-dihydroxy ethyl ether); triethylene glycol (ethylene glycol bis-(2-hydroxy ethyl ether); propanediol-1,2; butanediol-1,3; 2,2-dimethyl propanediol-1,3; butene (2)-diol-1,4, glycerol, pentaerythritol, mannitol, 2,2 bis-(4-hydroxyphenyl)-propane, and others. Mixtures of such acids and/or alcohols may also be used. The unsaturated di- or polycarboxylic acids may be replaced, at least partly, by saturated carboxylic acids such as adipic acid, succinic acid, sebacic acid, and others, or by aromatic dicarboxylic acids, such as phthalic acid, tetrahydrophthalic acid, and others, and their anhydrides such as phthalic anhydride. The acids used as well as the alcohols employed may be substituted by other substituents, preferably by halogen. Examples of suitable halogenated acids are, for instance, tetrachloro phthalic acid; 1,4,5,6,7,7-hexachloro bicyclo (2,2,1) heptene (5)-2,3-dicarboxylic acid, and others, or their anhydrides.

The other components of the unsaturated polyester resin compositions are unsaturated monomers, preferably ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate, ethyl acrylate, and others, which are copolymerizable with said polyesters.

The polymerization reactions initiated by the esters of the invention are carried out in conventional equipment following procedures familiar to workers in the field. The amount of initiator employed is chosen according to the desired effect. The reaction temperature is chosen in accordance with the half life of the initiator.

The following Examples are further illustrative of the method of the invention.

EXAMPLE 1

An autoclave of 250 ml capacity equipped with a stirrer was charged with 130 ml distilled water, 2 ml 5% polyvinyl alcohol solution and 0.105 g tert-butyl peroxy octoate. The air in the autoclave was replaced by nitrogen by twice evacuating the autoclave and flushing it with nitrogen. Thereafter, 70 g vinyl chloride was introduced under pressure, and the autoclave was placed in a water bath, and held at 65°C while its contents were being stirred. Samples were withdrawn from time to time and analyzed for polymer content from which the total amount of polymerized vinyl chloride was calculated.

In an identical second autoclave, the same suspension polymerization procedure was followed simultaneously, but the tert-butylperoxy octoate was replaced by an equimolecular amount of pinaneperoxy octoate.

The amounts of polymerized vinyl chloride determined from samples of both runs are listed in Table 1 in percent of the monomer originally present.

TABLE 1

| Initiator | Percent Polyvinylchloride | | | |
|---|---|---|---|---|
| | 1 hr. | 2 hrs. | 4 hrs. | 6 hrs. |
| t-Butylperoxy octoate | 5.7 | 11.4 | 42.8 | 74.2 |
| Pinanylperoxy octoate | 11.4 | 22.8 | 68.6 | 85.7 |

As is evident from the Table, pinanylperoxy octoate is much more reactive than tert-butylperoxy octoate under the same conditions.

EXAMPLE 2

Two test tubes having internal dimensions of 30 mm diameter and 200 mm length were each charged with 100 g of an unsaturated polyester resin composition containing 1 g of t-butylperoxy octoate. A thermocouple was immersed in each block polymerization mixture to a precisely defined depth in precisely centered, fixed position.

A corresponding second pair of test tubes was charged with a mixture of the same amount of resin composition and an amount of pinanylperoxy octoate equimolecular with the initiator in each tube of the first pair.

An additional test tube was charged with the same resin composition and 1% (by weight) t-butylperoxy benzoate, and yet another test tube with an analogous mixture containing pinanylperoxy benzoate instead of the tert-butyl derivative in an equimolecular amount.

One member of each pair was placed in an oil bath maintained at 60°C and the other member in an oil bath at 80°C. The resins catalyzed with peroxy benzoate were placed in the 80°C bath. The several thermocouples were connected to a multiple-track temperature recorder. From the chart drawn by the recorder, the time required by each batch of resin to reach a temperature 5°C above the external bath temperature was determined and considered the gel time ($t_{gel}$). The highest temperature reached by each batch ($T_{max}$) and the time ($t_{max}$) required to reach $T_{max}$ were also read from the chart. These values are listed in Table 2.

TABLE 2

| Peroxyester | Bath temp.°C | $t_{gel}$ min. | $t_{max}$ min. | $T_{max}$°C |
|---|---|---|---|---|
| Pinanylperoxy octoate | 60 | 14.3 | 18.5 | 212 |
| t-Butylperoxy octoate | 60 | 42.0 | 48.1 | 201 |
| Pinanylperoxy octoate | 80 | 5.1 | 7.0 | 228 |
| t-Butylperoxy octoate | 80 | 8.3 | 11.0 | 221 |
| Pinanylperoxy benzoate | 80 | 23.3 | 28.3 | 221 |
| t-Butylperoxy benzoate | 80 | 53.5 | 62.5 | 210 |

The unsaturated polyester resin composition employed in this Example was prepared as follows:

4.4 Moles 1,3-butanediol was esterified with 4 moles maleic acid anhydride by heating at 180° to 190°C for seven hours. 70 Parts (by weight) of the polyester so obtained was mixed with 30 parts styrene and 0.01 part hydroquinone. The liquid resin mixture had an acid number of 27.

Closely similar results were obtained with commercial unsaturated polyester resin compositions whose chemical compositions are not precisely known at this time.

What is claimed is:

1. In a method of polymerizing an olefinically unsaturated monomer in the presence of a peroxyester capable of forming free radicals, the improvement which consists in said peroxyester being an ester of pinane hydroperoxide of the formula

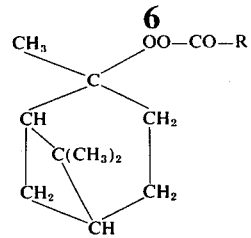

wherein R is primary, secondary, or tertiary alkyl, cycloalkyl, aralkyl, aryl, haloaryl, alkylaryl, alkoxyaryl, alkoxyalkyl, or arylalkyloxyalkyl, the amount of said ester being sufficient to cause polymerization of said monomer.

2. In a method as set forth in claim 1, R being heptyl.

3. In a method as set forth in claim 1, R being phenyl.

4. In a method as set forth in claim 1, R being alkyl having 3 to 12 carbon atoms.

5. In a method as set forth in claim 1, R being cycloalkyl having 5 to 12 carbon atoms.

6. In a method as set forth in claim 1, R being chlorophenyl, alkylphenyl, or alkoxyphenyl.

7. In a method as set forth in claim 1, R being ethoxymethyl, benzyloxymethyl, or phenoxymethyl.

8. In a method as set forth in claim 1, R being hydrocarbyl, hydrocarbyloxyhydrocarbyl, or halohydrocarbyl.

9. In a method as set forth in claim 1, said monomer constituting one component of an unsaturated polyester resin composition further including a polyester having an ethylenically unsaturated double bond.

* * * * *